United States Patent Office 2,937,958
Patented May 24, 1960

2,937,958

PROCESS FOR THE EXTRACTION OF SUGAR FROM SUGAR-CONTAINING MATERIALS THAT HAVE BEEN TREATED WITH A CELL-KILLING AGENT

Hein Israël Waterman, Delft, Netherlands, assignor to N.V. Centrale Suiker Maatschappij Fabriek Wittouck, Breda, Netherlands, a corporation of the Netherlands No Drawing. Filed Aug. 4, 1958, Ser. No. 753,099

Claims priority, application Netherlands Aug. 21, 1957

7 Claims. (Cl. 127—44)

Sugar-containing juices are usually obtained by extracting sugar-containing vegetable material, such as e.g. sugar beets or sugar cane, at temperatures between 70 and 80° C., which treatment is referred to by the name of "hot diffusion."

In general it is not advisable to expose living material to a high temperature, because this will practically always result in undesirable decompositions. In view of this there has been no lack of attempts to reduce the temperature during the extraction of sugar-containing vegetable material, but these always failed owing to the requirement that, in order to make possible the extraction of the sugar-containing materials, the protoplasm of the walls of the cells first has to be destroyed so as to suppress the semi-permeability of the cell wall. Not until the cell wall has been killed can the sugar be obtained by diffusion. In the hot diffusion process this destruction of the cell wall was always effected by exposition of the sugar-containing material to high temperatures.

From the Austrian patent specification No. 47,160 it is known that the temperatures during the extraction of sugar-containing materials can be reduced if a solution of sulphurous acid is added during the extraction. The directions given in this patent, however, produce a juice unsuitable for further treatment.

Waterman and co-workers have given a practicable form to the extraction with the aid of a solution of sulphurous acid, in which the $SO_2$ solution is dispensed as far as possible into the extraction apparatus on the side of the fresh material and the extraction takes place at about 40° C. (cold $SO_2$ diffusion). By means of this method a juice is obtained which differs essentially from the diffusion juice obtained at a high temperature. In fact, the juice obtained by the cold $SO_2$ diffusion is almost entirely free from colloids and consequently is much easier to purify than the juice obtained by hot diffusion.

The Waterman method, however, has a number of drawbacks which are due to the relatively large quantity of $SO_2$ required in this process. Indeed, this quantity amounts to 0.3% on the original sugar-containing material. In consequence a comparatively low minimum pH occurs in the diffusion battery, viz. about 3.1, so that the diffusion must be made from corrosion-resistant material, while moreover the quantity of inorganic salts that get into the juice is larger than in the case of hot diffusion, which results in a lower yield of crystal sugar. Finally, because the destruction of the cells takes place in the diffusion battery it is not possible for the whole of the period during which the sugar-containing material is present in this battery to be used for the diffusion.

An old process is also known, according to which $SO_2$ is admitted during the grounding or rasping and pressing of sugar-containing material (British patent specification No. 2,603/1856). The subsequent treatment, however, is identical with the usual method of the time. This process was intended to prevent discoloration of the pulp and the juice. The German patent specification No. 653,098 describes the treatment of cossettes with $SO_2$ gas. However, this is also followed by the conventional hot diffusion.

From "La Sucrerie Belge" 1952/53, pp. 63 ff., another agent for killing cossettes is known, viz. chloroform. This is used in a concentration of 0.6–1% on beet. Satisfactory extraction at a low temperature is thus attained, but the percentage of invert sugar in the raw juice is high and the pulp and raw juice thus obtained are very dark-coloured to black. On these reasons the process cannot be used in industry.

Applicant has found that a satisfactory killing of the cells can also be achieved if the sliced material, before it enters the extraction apparatus, is caused to absorb $SO_2$ gas; the killing takes place under the same circumstances of time and temperature as the killing by chloroform just mentioned. The quantity of $SO_2$ has to be 0.1% on beet. The extraction was subsequently effected by cold diffusion; the pulp thus obtained had a good colour, the filtration rate was also good, i.e. comparable to that in the cold $SO_2$ diffusion process. However, the method presents two serious drawbacks: it is necessary to operate in acid-resistant apparatus and the ash content of the raw juice is fairly high.

Applicant has now made the striking discovery that very good results are obtained by the following procedure. The material is first exposed to the action of at most 0.05% of $SO_2$, on the sugar-containing material, and subsequently to that of chloroform, after which the sugar-containing material thus treated is subjected to diffusion at a temperature ranging between room temperature and 50° C.

The material can beforehand be heated to the desired temperature by means of hot air or hot juice; a temperature between 35 and 45° C. is very suitable. Material having a temperature of about 40° C. is preferably used. In order to obtain good results, 0.02–0.05% of $SO_2$ is preferably added and this is caused to react with the material for a short time, i.e. up to at most about 10 and preferably 5 seconds. Subsequently the chloroform is preferably added in such a way that the atmosphere is saturated or approximately saturated with chloroform at the working temperature. The action of chloroform has to last longer, viz. 5–15 minutes, preferably 10 minutes. Only then is the chloroform removed. The cells have now been killed and the material can be introduced into the extraction apparatus, where it is extracted at a temperature in the range between room temperature and 50° C., preferably between about 20 and 30° C.

The introduction of $SO_2$ and $CHCl_3$ takes place effectively in such a way that the vessel in which the sugar-containing material is present is partially evacuated, e.g. to a pressure of about 60 cm. mercury during the introduction of $SO_2$ and to a pressure of about 15 cm. mercury during the introduction of chloroform. A very suitable vessel is a revolving drum. A tank of the diffusion battery can also be used for this purpose.

The new process described above, when applied to cossettes, has the following advantages:

(1) The degree of extraction is comparable to that obtained in the normal hot diffusion process and also to that resulting from the cold diffusion with 0.3% of $SO_2$.

(2) The pulp has a good colour, in great contrast with that obtained according to La Sucrerie Belge 1952/53 l.c.

(3) The ash content of the raw juice is not higher than in the normal hot diffusion process; the cold $SO_2$ diffusion with 0.3% of $SO_2$ on the contrary results in a high ash content of the raw juice.

(4) The percentage of invert sugar in the raw juice is equal to that in the hot diffusion and the cold 0.3% $SO_2$ diffusion processes. The chloroform killing process according to La Sucrerie Belge on the other hand results in a high percentage of invert sugar.

(5) The properties of the raw juice obtained according to the invention with respect to filtration are as good as those of the raw juice obtained in the cold 0.3% $SO_2$ diffusion process. The filtration properties of the juice obtained by the method described in La Sucrerie Belge, on the contrary, are poor.

(6) Whilst in the normal diffusion process about 1.5% of lime and carbonation to a pH of about 11.0 are required for good filtration, an equally good purification is attained in the process according to the invention by the addition of a small quantity of lime (0.2–0.3%) until the pH is about 11.

(7) It is not necessary to use corrosion-resistant apparatus. A number of these advantages are obtained, if the process of the invention is applied to sugar cane slices.

Example I

A revolving drum, which can be heated, is filled with 100 kg. of cossettes. The cossettes are heated to 40° C. The drum is evacuated to a pressure of 60 cm. mercury. From a container with $SO_2$ gas a quantity of $SO_2$ equal to 0.05% on beet, is dispensed. The pressure remains 60 cm. mercury, since the $SO_2$ is immediately absorbed by the cossettes. After the introduction of the $SO_2$ the pressure in the drum is reduced to 15 cm. mercury and chloroform is admitted. The interior of the drum becomes saturated with chloroform vapour and the pressure increases to about 50 cm. mercury. This situation is maintained for 10 minutes. The chloroform vapour is drawn off again and after the pressure has been increased to atmospheric pressure again, the drum is emptied. With the cossettes thus killed a diffusion test on a semi-technical scale is carried out. The battery consists of ten tanks of 18 l. capacity each. The temperature of the diffusion water is 15° C. No further heating takes place. The contact period is 80 minutes. The juice draft is 110.

The result is as follows:

| | Percent |
|---|---|
| Sugar in pulp | 0.35 |
| Raw juice: | |
| G. of invert/100 Brix | 2.23 |
| G. of ash/100 Brix | 2.83 |
| pH | 5.5 |

A diffusion test carried out in the heat in this battery at a maximum temperature of 80° C. with the same grade of cossettes, which had not been treated with $SO_2$ and $CHCl_3$, yields the following result:

| | Percent |
|---|---|
| Sugar in the pulp | 0.30 |
| Raw juice: | |
| G. of invert/100 Brix | 2.31 |
| G. of ash/100 Brix | 2.85 |
| pH | 6.2 |

As follows in comparison with Table 3 on page 36 of Sugar, October 1951, the disadvantages of the cold $SO_2$ diffusion using 0.3% $SO_2$ have disappeared; the ash content of the raw juice according to the invention and that of the hot diffusion juice are substantially the same whereas the pH value of the raw juice according to the invention (5.5) is much higher than that of the raw juice of Table 3 of the aforementioned articles (4.2).

Example II

Cossettes are heated to 40° C. by means of heated raw juice. To this raw juice 0.03% of $SO_2$ on beet has been added. Subsequently the raw juice and the cossettes are separated and the cossettes are introduced into a tank with a capacity equal to that of a tank of the diffusion battery. After evacuation, chloroform vapour is circulated for 12 minutes through the tank. The circumstances of the subsequent diffusion are as described in Example I.

Result:

| | Percent |
|---|---|
| Sugar in the pulp | 0.35 |
| Raw juice: | |
| G. of invert/100 Brix | 2.29 |
| G. of ash/100 Brix | 3.01 |
| pH | 5.7 |

A hot diffusion with untreated cossettes under the same circumstances and at 80° C. gave the following values:

| | Percent |
|---|---|
| Sugar in the pulp | 0.28 |
| Raw juice: | |
| G. of invert/100 Brix | 2.23 |
| G. of ash/100 Brix | 2.98 |
| pH | 6.3 |

Example III

With the juice obtained according to Example I a purification test has been performed. The juice is brought to a pH of about 11.0 at 50° C. by a preliminary purification according to Brieghel-Müller with lime. The quantity of lime required for this is 0.15–0.2% on beet. The juice from the apparatus for the preliminary purification is heated to 90° C. and filtered over 0.32 m.² of filter area. The filtration rate, which can be characterized by l.²/sec., in this case is 3.40. The frames are completely filled and the filter cake is hard.

A purification test with raw juice obtained from the same grade of beets, which had not been subjected to a preliminary treatment, in the semi-technical apparatus at 80° C. is carried out according to the method required in practice, i.e., it is first subjected to a preliminary purification with 0.15–0.2% of CaO in the apparatus according to Brieghel-Müller, then heated to 90° C. and subsequently 1.2% of CaO, on beet, is added. After 15 minutes' chaulation time the juice is carbonated to a pH of about 11.0 and subsequently filtered over 0.32 m.² of filter area. In this case the filtration rate is 3.44 l.²/sec.

Example IV

A raw juice obtained according to Example I, but without addition of $SO_2$, is purified with 0.15–0.2% of CaO, as described in Example III. The filtration rate with 0.32 m.² of filter area is 0.55 l.²/sec.

What I claim is:

1. A process for the extraction of sugar from sugar-containing material by first reacting it with a cell-killing agent, characterized in that the material is first exposed briefly to the action of at most 0.05% of $SO_2$ based on the weight of the sugar-containing material, whereby the $SO_2$ is rapidly absorbed by the material, and thereupon the material is exposed for several minutes to the action of chloroform, after which the sugar-containing material thus reacted is subjected to diffusion at a temperature ranging between room temperature and 50° C.

2. A process according to claim 1, characterized in that the material is treated with the cell-killing agents at a temperature ranging between 35 and 45° C., preferably at about 40° C.

3. A process according to claim 1, characterized in that 0.02–0.05% of $SO_2$ on sugar-containing material, is added.

4. A process according to claim 1, characterized in that the material is treated in an atmosphere at least approximately saturated with chloroform vapour.

5. A process according to claim 1, characterized in that the SO₂ and the chloroform are passed into the material by partially evacuating the space in which the material is present.

6. A process according to claim 1, characterized in that the material is agitated and tumbled upon itself throughout the treatment with SO₂ and CHCl₃.

7. A process according to claim 1, characterized in that the action of the SO₂ lasts at most 10 sec. and preferably up to 5 sec., and the action of the CHCl₃ lasts 5–15 min., preferably 10 minutes.

References Cited in the file of this patent

UNITED STATES PATENTS

| | | |
|---|---|---|
| 1,372,891 | Mengelbier | Mar. 29, 1921 |
| 2,829,985 | Hingst et al. | Apr. 8, 1958 |

OTHER REFERENCES

The International Sugar Journal, art. by Waterman, May 1951, p. 136.

Manufacture of Sugar From Cane and Beet, by Heriot, pub. by Longmans, Green and Co., New York, N.Y., 1920, pp. 237–239.